Feb. 2, 1960 A. ROANO 2,923,167
REVERSIBLE GEARS
Filed June 6, 1955 2 Sheets-Sheet 1

Feb. 2, 1960 A. ROANO 2,923,167
REVERSIBLE GEARS
Filed June 6, 1955 2 Sheets-Sheet 2

United States Patent Office 2,923,167
Patented Feb. 2, 1960

2,923,167

REVERSIBLE GEARS

Alessandro Roano, deceased, late of Naples, Italy, by Francesco Roano, Ada Roano, Guglielmo Roano, Gino Roano, and Roberto Roano, Naples, Italy, heirs, assignors to Phillac S. A., Geneva, Switzerland Application June 6, 1955, Serial No. 513,532

Claims priority, application Italy March 1, 1955

9 Claims. (Cl. 74—466)

Copending U.S. patent application Serial No. 449,299, filed August 12, 1954, now Patent No. 2,789,442, of April 23, 1957, relates to a pair of gears having helicoidal teeth, between parallel axes, in which the inclination of the middle helix of the teeth of the pinion and the middle helix of the teeth of the gear wheel are different but have the same axial pitches, and the gears are characterized by the fact that the corresponding profiles forming the sides of the sections of the teeth of the pinion and of the gear wheel are each formed on a single arc of a circle both for the pinion as well as for the gear wheel. The present application is a continuation-in-part of above-identified application and relates to a particular form of the gear therein described.

The reversible gears according to Patent No. 2,789,442 and according to the present application have helicoidal teeth disposed on parallel axes, with the middle helix of the teeth of the pinion, and the middle helix of the teeth of the wheel, differently inclined but with the same axial pitches. The gears are characterized by the fact that the corresponding profiles of the teeth of the pinion and of the gear wheel are completely outside and spaced with respect to one of the pitch circles and are on the inside and spaced with respect to the other pitch circle, and by the fact that the zone of contact between the teeth of the gear wheel and those of the pinion is constantly and completely displaced with respect to the plane of the axes.

In a particular embodiment, the gears are characterized by the fact that the sides of the teeth of the pinion are completely outside and spaced from the rolling circumference of the pinion, and the sides of the teeth of the wheel are completely on the inside and spaced from the rolling circumference of the gear wheel.

According to this invention the gears are further characterized by the fact that the profiles of the sides of the tooth sections made by means of a plane passing through the axes are each defined by a curve having at its successive circumferential points only very slightly variable radii of curvature and, therefore, it approaches very closely a true arc of a circle.

The gears of this invention are further characterized by the fact that the two profiles, each having a slightly variable radius of curvature, have a middle radius of curvature in one of the profiles which is of a length which is very close to the middle radius of curvature of the other corresponding profile.

The gears are further characterized by the fact that the two profiles are respectively convex and concave.

According to the invention the gears are further characterized by the fact that the middle radii of curvature of the concave and the convex profiles of the sections of the teeth of the pinion and of the gear wheel mesh with each other though being necessarily different, so that said arcs constitute corresponding profiles, and are only slightly different. As a result, by reason of the unavoidable local elastic deformation of the materials, a real surface of contact will result, and this surface of contact will have the maximum possible extension when under equal load, and therefore the specific pressure will be reduced to the minimum.

The gears are further characterized by the fact that the corresponding profiles used for the sides of the teeth of the pinion and the teeth of the wheel cause the formation of a hydrodynamic lubricating film between the teeth, presenting a substantial bearing character. This film is formed as a result of the cooperation of the following factors: (a) the middle radii of curvature of the two corresponding profiles are of almost the same value; (b) the sliding between the teeth always occurs in the same direction along the complete meshing arc because the contact between the teeth is effected wholly on one side of the plane of the axes; (c) the speed of sliding is of a high value; (d) the speed of sliding has a transverse direction with respect to the middle longitudinal line of the real zone of contact as a result of the film of oil and the elastic deformation of the surfaces of the teeth. This sliding occurs because the profiles are displaced with respect to the pitch circles as well as because the teeth are helicoidal.

In one of the embodiments, the gears according to the invention are characterized by the fact that the corresponding profiles of the pinion and of the wheel are cycloidal arcs, respectively, an epicycloid and a hypercycloid.

In another of the embodiments, the gears, according to the invention, are characterized by the fact that the corresponding profiles of the pinion and of the wheel are the arcs of the involute of a circle.

The annexed drawing shows in transverse section, only by way of example, some embodiments according to the invention, of meshing pairs of teeth. Referring to the drawing, Fig. 1 shows one position of corresponding profiles with respect to the pitch circles;

Figure 1:
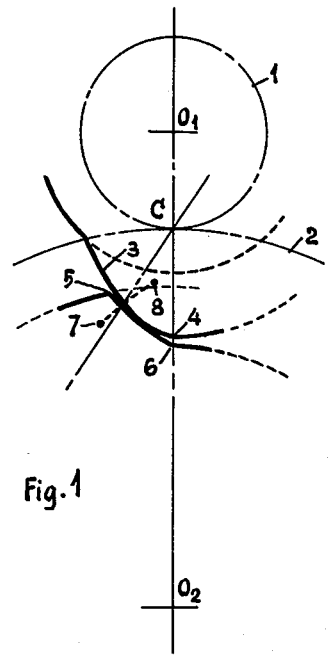

In all of the figures of the drawing the axes of the pinion and of the wheel are indicated by the letters $O_1$ and $O_2$ and the points of contact of the pitch circles 1 and 2 are indicated by C. Referring to Fig. 1, it will be seen that the corresponding profiles 3—4, which form the side of the section of the teeth of the pinion, and profiles 5—6 which form the side of the section of the teeth of the wheel, are completely outside the pitch circle 1 of the pinion and inside the pitch circle 2 of the wheel, and spaced from said pitch circle, and that the arc of contact 7—8 and, therefore, the zone of contact between the teeth of the pinion and that of the wheel, is constantly and completely displaced with respect to the plane $O_1$, $O_2$ of the axes. In this manner, in the case of one pair operating with a given transmission rate, a pinion is obtained having a diameter which is substantially larger than that of the pinion of a known pair operating at the same ratio, and the gear wheel has a diameter which is smaller than that of the corresponding known wheel. For the pair, there will, therefore, be substantially less weight and encumbrance and further teeth will be obtained which, without difficulty, will have, both for the pinion and for the wheel, dimensions which assure mechanical resistance to stress.

Figure 2:
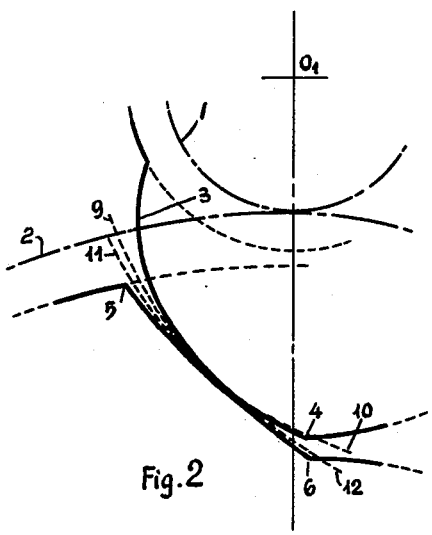
Fig. 2 shows the shape of the corresponding profiles, on a larger scale.

Referring to Fig. 2, it is seen that the profiles 3—4 and 5—6 of the sides of the teeth obtained with sections through a plane passing on the axes are defined by curves having at their successive circumferential points only very slight variable radii of curvature and, therefore, approaches true arcs of the circles 9—10 and 11—12, respectively. Fig. 2 further shows that the two profiles 3—4 and 5—6, are respectively convex and concave and both have a very slightly variable radius of curvature. The middle radius of curvature of one of the profiles has a value which is very close to the middle radius of curvature of the corresponding profile.

From the above it will be apparent that the middle raddi of curvature of the profiles 3—4 and 5—6, one convex and the other concave, of the sections of the teeth of the pinion and of the gear wheel, though necessarily being different so that the arcs will define cooperating profiles, are actually only slightly different, and as a result, by reason of unavoidable local elastic deformation of the materials, a real surface of contact will result and it will have the largest extension which it is possible to have under a given load and, therefore, the specific pressure which may result will be reduced to the minimum.

As a direct consequence of the above-mentioned characteristics of the corresponding profiles used for the sides of the tooth of the pinion and of the tooth of the gear wheel, a film of a hydrodynamic lubricating material having high bearing characteristic is obtained between the teeth. This film is formed as the result of the cooperation of the following factors (a), (b), (c) and (d) mentioned above.

Figure 3:
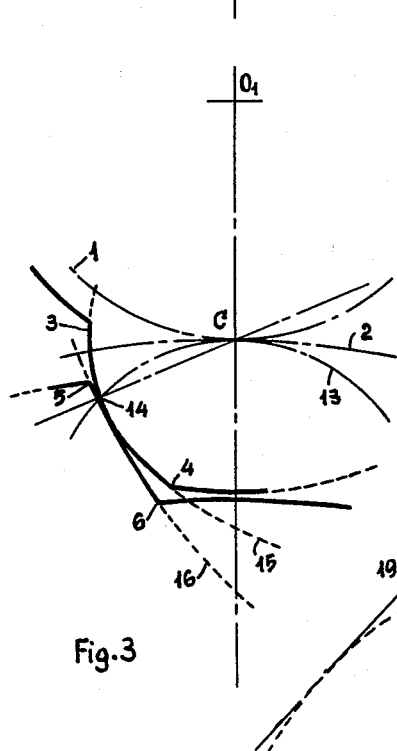
Fig. 3 shows an embodiment of a cycloidal profile.

Fig. 3 shows a pair of gears having cycloidal profiles. In this figure, 13 is the epicycle which, while rolling on the pitch circles 1 and 2, generates with its point 14, the epicycloid 15, from which the profile 3—4 of the side of the section of the tooth of the pinion is taken and the hypercycloid 16 from which the profile 5—6 of the side section of the tooth of the wheel is taken.

Figure 4:
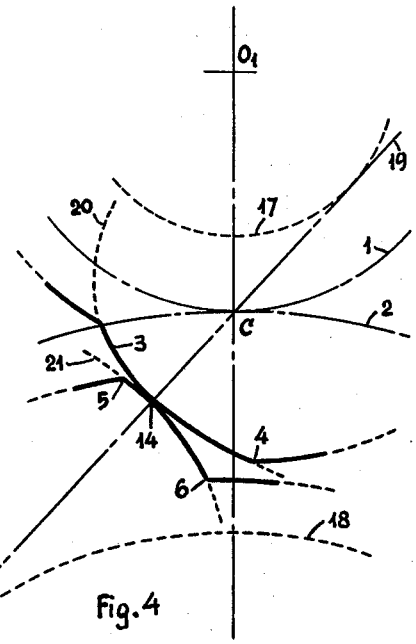
Fig. 4 shows an embodiment of an involute profile.

Fig. 4 analogously shows the construction of a pair of gears having involute profiles. In this figure, 17 and 18 are the base circles on which the line 19—19 rolls, defining with its point 14 the involute 20 from which the profile 3—4 is taken of the side of the section of the tooth of the pinion, and the involute 21 from which the profile 5—6 of the side of the section of the tooth of the wheel is taken.

Figure 5:
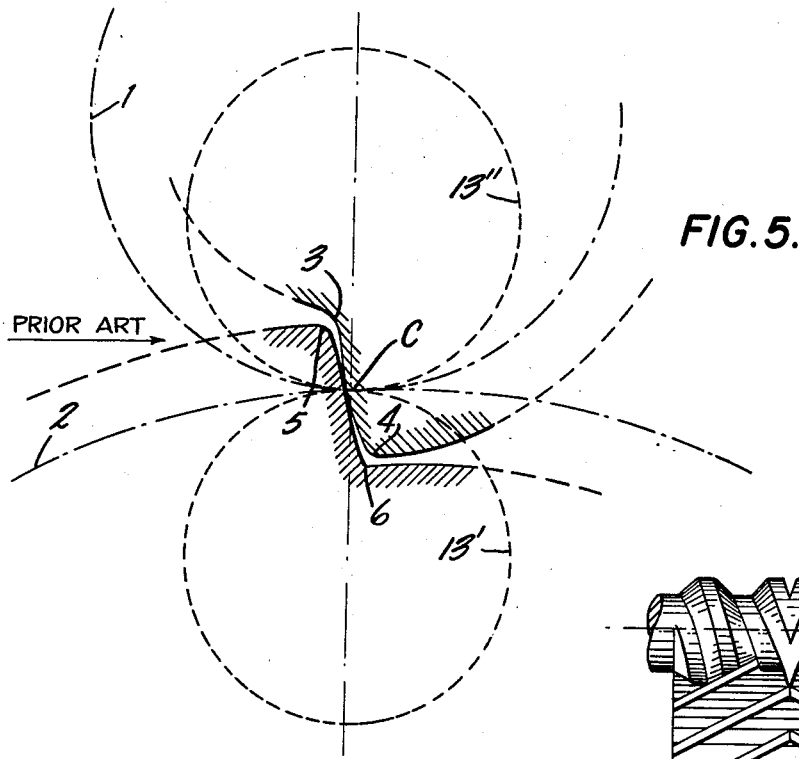
Fig. 5 is an enlarged fragmentary view of gears constructed in accordance with known principles.
Figure 7:
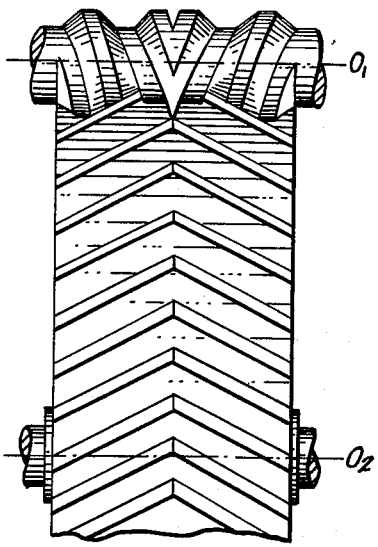
Fig. 7 is a front elevational view of helical gears constructed in accordance with the invention.
Figure 6:
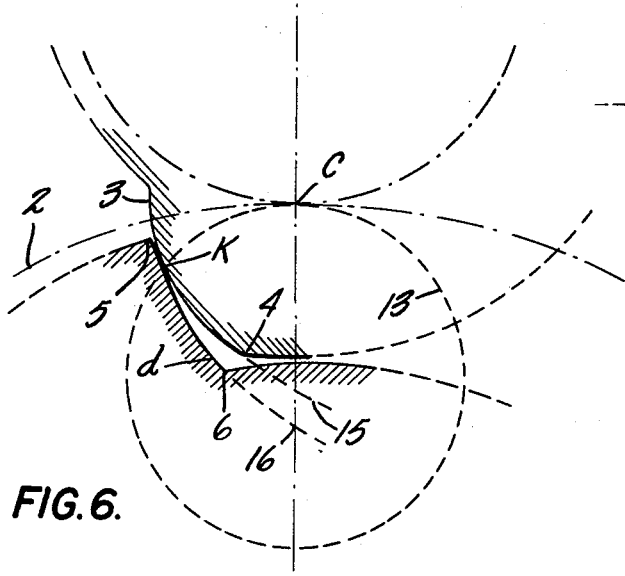
Fig. 6 is a similar view of gears embodying features of the present invention.

Figs. 5 and 6 emphasize the differences between the present invention and prior constructions.

Referring, for example, to Figs. 13 and 14 of U.S. Patent No. 2,789,442 in which the profiles of the cross sections of the teeth are drawn with radius $r=22$ and $r=14.90$, the teeth cross-sections have profiles corresponding exactly to arcs of true circles. The advantages, especially in the manufacture of the teeth, of the construction of the patent are described therein.

The discovery has been made, however, that it was not necessary for the profiles of the teeth to be true circle arcs, and that by the use of profiles which have slightly variable radii of curvature and approach closely but are not exactly true circles arcs, the same advantages that are obtained by the patent construction can be realized and at the same time the teeth profiles could be formed more rapidly and much more easily.

In other words, according to the present invention the profiles of the teeth cross-sections are very close to true circle arcs, whereas according to U.S. Patent No. 2,789,442 the profiles are exactly and mathematically true circle arcs, yet the advantages of the gears of the patent, however, are surprisingly retained yet the formation of the meshing teeth is much easier than that of the teeth of the patent.

Fig. 5 shows the known construction with the same reference numbers used, for instance, in Fig. 3, being employed. It will be seen that the two pitch circles 1 and 2 make contact in point C. In the known construction there are the two circles 13′ and 13″ which, respectively, roll on circle 2 and circle 1. When circle 13′ rolls on pitch circle 2, point C defines the cycloid C—6, when circle 13″ rolls on the pitch circle 2, point C defines the cycloid C—5. In this way there is defined the curve 5—C—6 which is partially outside of the pitch circle 2 and partially inside the same.

Considering now the tooth of the other wheel, when the circle 13′ rolls on the pitch circle 1, point C defines the cycloid C—4. When circle 13″ rolls on the pitch circle 1, point C defines the curve C—3. The tooth profile 3—C—4 is thus formed and this profile is partially outside and partially inside the pitch circle 1.

Fig. 6 is illustrative of the present invention. According to the invention, there are again found the two pitch circles 1 and 2 but only one circle 13 is needed to roll along pitch circle 1 and pitch circle 2. When circle 13 rolls along pitch circle 1, a point K, which is completely separate from and well spaced from point C, defines the cycloid 3—K—4—15. When circle 13 rolls along the pitch circle 2, the same point K defines the cycloid 5—K—16.

The active profile of the cross section of the sprocket tooth is defined by the portion 3—K—4 which is entirely outside the pitch circle 1 of the wheel, whereas the profile 3—O—4 of the known wheel (Fig. 5) is partially outside and partially inside the pitch circle 1. The active profile of the cross section of the other wheel tooth is defined by the portion 5—K—d which is entirely inside the pitch circle 2 of the wheel, whereas the profile 5—C—6 of the known corresponding wheel (Fig. 5) is partially inside and partially outside of the pitch circle 2 of the wheel.

The portions 3—K—4 and 5—K—d, as shown in the drawings, assume a conformation which may be considered substantially as a circle arc. The same considerations relating to original Fig. 3 in which is shown a circle 13 rolling on the pitch circles 1 and 2 may be applied to Figs. 1 and 2 (for the cycloidal wheel) and to Fig. 4 (for the involute wheel).

Though for the sake of ease of description this invention is described by reference to U.S. Patent No. 2,789,442 and is shown, only by way of example, in the annexed drawings, many variations may be made in the embodiments of the invention without departing from the scope of the appended claims.

What is claimed is:

1. A pair of reversible gears having helicoidal teeth and running between parallel axes, the helices of the teeth of the pinion and those of the gear wheel having different inclinations with respect to their respective axes, the helices of the teeth of the pinion and those of the gear wheel having different inclinations with respect to their respective axes, the helices of the teeth of the pinion and those of the gear wheel having equal axial pitches, the contact between a tooth of the pinion and a tooth of the gear wheel occurring on a surface of contact that is shifted in relation to the plane of the axes of the gears, the lateral shapes of the sections of the teeth on both the pinion and the gear wheel being each a single arc of a circle, the corresponding profiles forming the sides of the sections of the teeth of the pinion and of the gear wheel being completely outside and spaced with respect to one of the pitch circles and being inside and spaced with respect to the other pitch circle.

2. Reversible gears as defined in claim 1 wherein the sides of the teeth of the pinion are completely outside and spaced from the pitch circle of the pinion, and the sides of the teeth of the gear wheel are completely inside and spaced from the pitch circle of the wheel.

3. Reversible gears as defined in claim 1, wherein the profiles of the sides of the teeth sections made by a plane passing through the axes are each defined by a curve having at successive circumferential points of its length radii of curvature varying only slightly and closely approaching an arc of a true circle.

4. Reversible gears as defined in claim 1, wherein the profiles of the pinion and of the wheel have a middle radius of curvature and wherein the middle radius of curvature of one of the profiles has a value that is very close to that of the middle radius of curvature of the other profile.

5. Reversible gears as defined in claim 1, wherein the profiles of the pinion and of the wheel are respectively convex and concave.

6. Reversible gears as defined in claim 5, wherein the middle radii of curvature of the concave and the convex profiles of the sections of the teeth of the pinion and of the gear wheel are only slightly different, whereby upon local elastic deformation a real surface of contact between the pinion and the gear wheel will result and specific pressure will be reduced to a minimum.

7. Reversible gears as defined in claim 1, wherein the corresponding profiles of the sides of the teeth of the pinion and of the teeth of the wheel have middle radii of curvature of substantially the same value and contact between the teeth of the pinion and the teeth of the wheel is effective completely on one side of the plane of the axis of said pinion and wheel, whereby the speed of sliding between the teeth always occurs in the same direction along the complete meshing arc and the teeth permit the formation of a hydrodynamic lubricating film therebetween.

8. Reversible gears as defined in claim 1, wherein the corresponding profiles of the pinion and of the wheel are cycloidal arcs, respectively, of an epicycloid and a hypercycloid.

9. Reversible gears as defined in claim 1, wherein the corresponding profiles of the pinion and of the wheel are arcs of the involute of a circle.

References Cited in the file of this patent

UNITED STATES PATENTS 2,553,384     Roano _____ May 15, 1951